United States Patent [19]
Cove

[11] Patent Number: 5,431,188
[45] Date of Patent: Jul. 11, 1995

[54] FLOW TRIM FOR CHOKE

[75] Inventor: Richard Cove, Edmonton, Canada

[73] Assignee: Master Flo Valve, Inc., Edmonton, Canada

[21] Appl. No.: 217,905

[22] Filed: Mar. 25, 1994

[51] Int. Cl.⁶ .............................. F16K 3/34
[52] U.S. Cl. .................... 137/625.3; 251/210
[58] Field of Search .......... 137/625.37, 625.3; 251/210

[56] References Cited

U.S. PATENT DOCUMENTS

| | | | |
|---|---|---|---|
| 4,041,982 | 8/1977 | Lindner | 137/625.37 X |
| 4,540,022 | 9/1985 | Cove | 137/625.37 X |
| 4,569,370 | 2/1986 | Witt | 137/625.37 X |

Primary Examiner—John C. Fox
Attorney, Agent, or Firm—Millen, White, Zelano, & Branigan

[57] ABSTRACT

The flow trim has inner and outer, spaced apart, tubular cylindrical, coextensive, ported walls which project across the inlet of the choke. A tubular throttling collar may be advanced longitudinally through the annular space between the ported walls, to vary the flow area of the ports. The arrangement enables staging of the pressure drop in increments through the ports of the choke. This reduces cavitation.

8 Claims, 5 Drawing Sheets

FLOW TRIM FOR CHOKE

FIELD OF THE INVENTION

This invention relates to a choke for controlling fluid flow in a line. The choke finds particular application in well drilling and production operations.

DESCRIPTION OF THE PRIOR ART

A choke is a form of heavy duty valve used to provide throttling and shut-off control in a line. Commonly, chokes are used in high pressure service, usually to control gas, oil or water flows which frequently contain entrained sand or other erosive particles.

The present invention is directed toward an improved form of a choke disclosed in my prior U.S. Pat. No. 4,540,022, issued Sep. 10, 1985 (referred to herein as the '022 patent).

In general, chokes involve:
- a valve body having an axial bore, side inlet and end outlet;
- a "flow trim" mounted in the bore between inlet and outlet, for throttling the flow moving through the body; and
- means for actuating the flow trim, said means closing the end of the bore remote from the outlet.

There are four main types of flow trim commonly used in commercial chokes. Each flow trim involves a port-defining member, a movable member for throttling the port, and seal means for implementing a total shut-off. These four types of flow trim can be characterized as follows:

(1) a needle-and-seat flow trim comprising a tapered annular seat fixed in the valve body and a movable tapered internal plug for throttling and sealing in conjunction with the seat surface;

(2) a cage-with-internal-plug flow trim, comprising a tubular, cylindrical cage, fixed in the valve body and having ports in its side wall, and a plug movable axially through the bore of the cage to open or close the ports. Shut-off is generally accomplished with a taper on the leading edge of the plug, which seats on a taper carried by the cage or body downstream of the ports;

(3) a multiple-port-disc flow trim, having a fixed ported disc mounted in the valve body and a rotatable ported disc, contiguous therewith, that can be turned to cause the two sets of ports to move into or out of register, for throttling and shut-off; and (4) a cage-with-external-sleeve flow trim, comprising a tubular cylindrical cage having ports in its side wall and a hollow cylindrical sleeve that slides axially over the cage to open and close the ports. The shut-off is accomplished with the leading edge of the sleeve contacting an annular seat carried by the valve body or cage.

The '022 choke has a type (4) flow trim.

Chokes for throttling liquid flows are subject to suffering damage arising from cavitation. More particularly, as liquid velocity increases through the restrictive port or orifice, a pressure drop occurs. If the pressure drops below the vapor pressure of the liquid, vapor bubbles form. As the flow leaves the 'vena contracta' (point of narrowest flow constriction) and enters the larger diameter bore of the cage, the flow velocity decreases, pressure increases, and the bubbles can collapse to re-form liquid. This gas-to-liquid conversion, called cavitation, can be destructive to metal surfaces.

A known solution for combatting cavitation is to design the flow trim so as to take the pressure drop in increments or stages, with the objective of keeping the pressure above the vapor pressure of the liquid.

The present invention is directed toward modifying the choke disclosed in the '022 patent, to reduce its susceptibility to cavitation by staging the pressure drop.

SUMMARY OF THE INVENTION

In accordance with the invention, a choke is provided having a flow trim adapted to reduce fluid pressure in two stages using two spaced apart cages through which the flow passes sequentially. The flow trim comprises:
- an external cage having a multi-ported, tubular, cylindrical wall extending transversely of the body inlet;
- an internal cage mounted within the outer cage and having a multi-ported, tubular, cylindrical wall that is generally coextensive with the wall of the external cage, said internal cage wall being inwardly spaced from the outer cage wall so that they form an annular space that is closed at its end adjacent the valve outlet but open at its other end; and
- a tubular, cylindrical throttling collar arranged to fit closely between the cylindrical walls and to slide along the annulus from its open end, to throttle the ports of the cages;
- the cages combining to make a cage assembly that has an annular shut-off seat at the closed end of the annulus;
- the throttling collar having an annular seal surface at its inner or leading edge, for seating against the shut-off seat to effect a total shut-off of flow;
- the inner cage preferably incorporating the port design of the '022 choke and thus having four ports arranged in pairs of diametrically opposed ports, the first opening pair having ports of relatively small diameter and the second opening pair having ports of relatively larger diameter, the port pairs being spaced along the length of the inner cage wall;
- the ports of the outer cage being designed so that the open port area of the inner and outer ports remains substantially equal at every collar throttling position, so that the pressure drop is about equal through the ports of the two cages;
- the ports of the outer cage preferably being more numerous in number than the inner cage ports and small in diameter in relation to the sound opening ports of the inner cage, to widely distribute the impinging streams from the outer cage ports over the surface of the inner cage and thereby distribute erosional wear; and
- the ports of the outer cage preferably being non-aligned with or circumferentially offset relative to the ports of the inner cage, to avoid linear flow through the outer and inner ports and the width of the annulus being greater than the diameter of any outer port, to ensure non-throttled flow in the annulus.

DESCRIPTION OF THE PREFERRED EMBODIMENT

Figure 1:
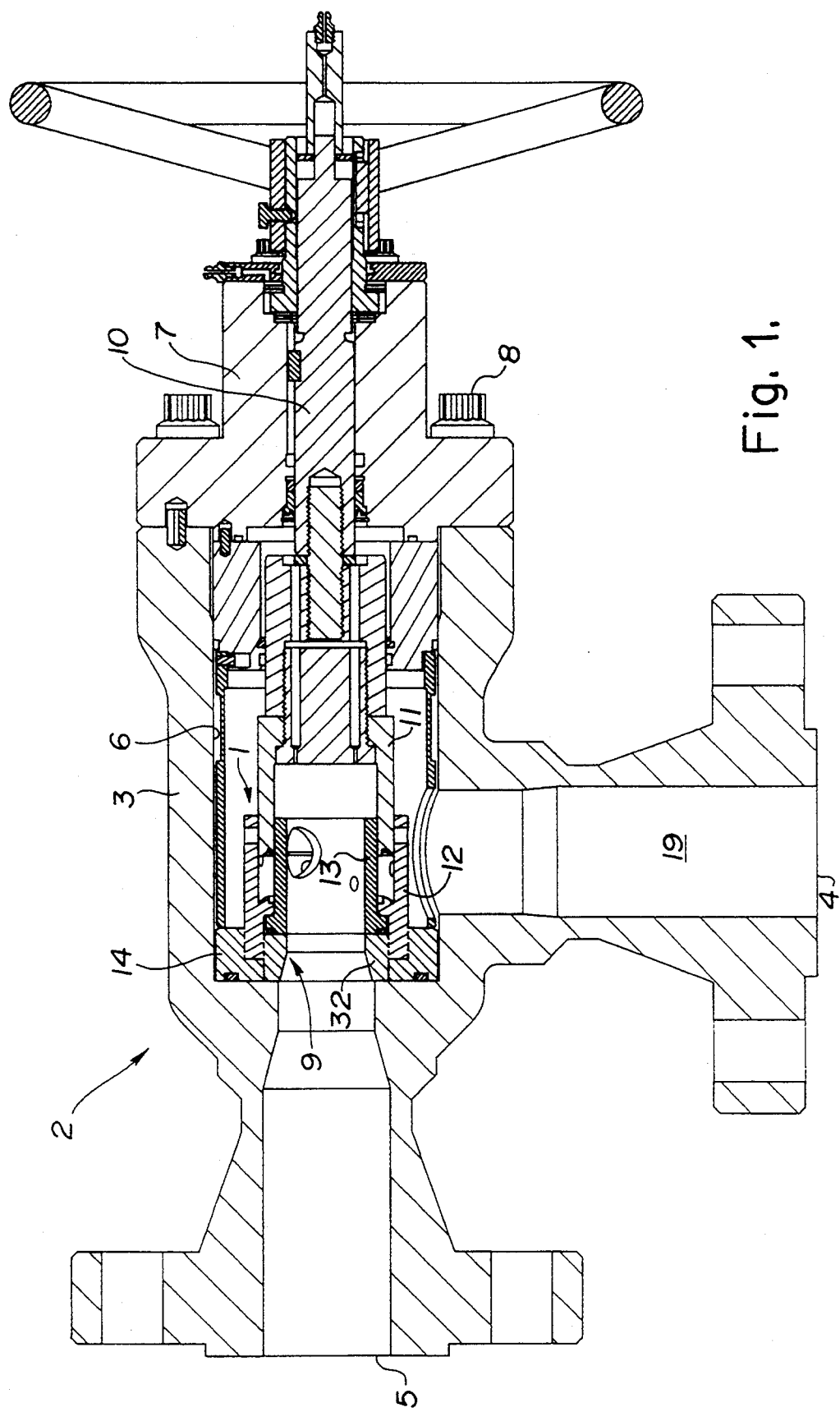
FIG. 1 is a sectional side view showing a choke containing a flow trim in accordance with the present invention.
Figure 2:
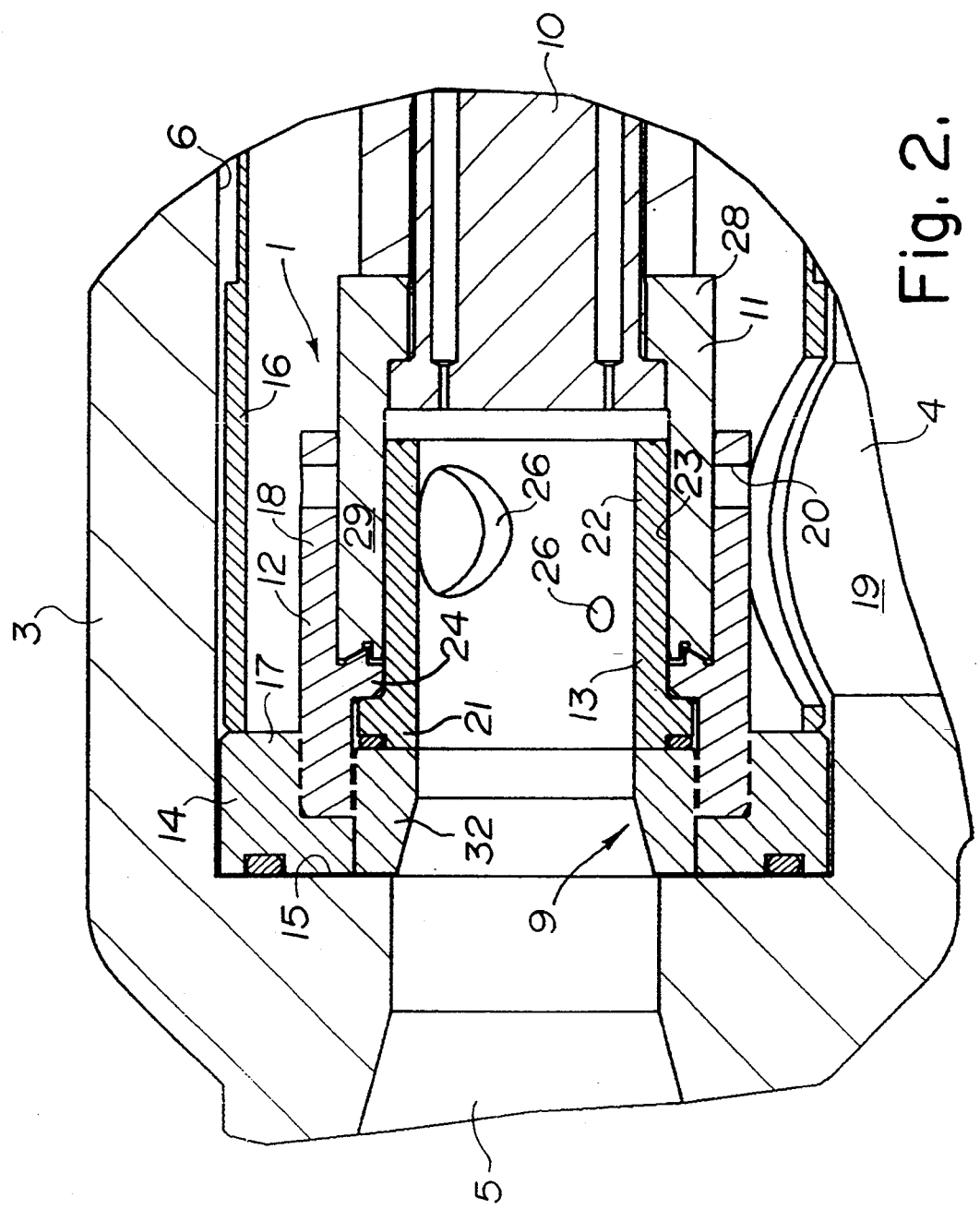
FIG. 2 is a sectional side view of the flow trim in the shut-off position.
Figure 3:
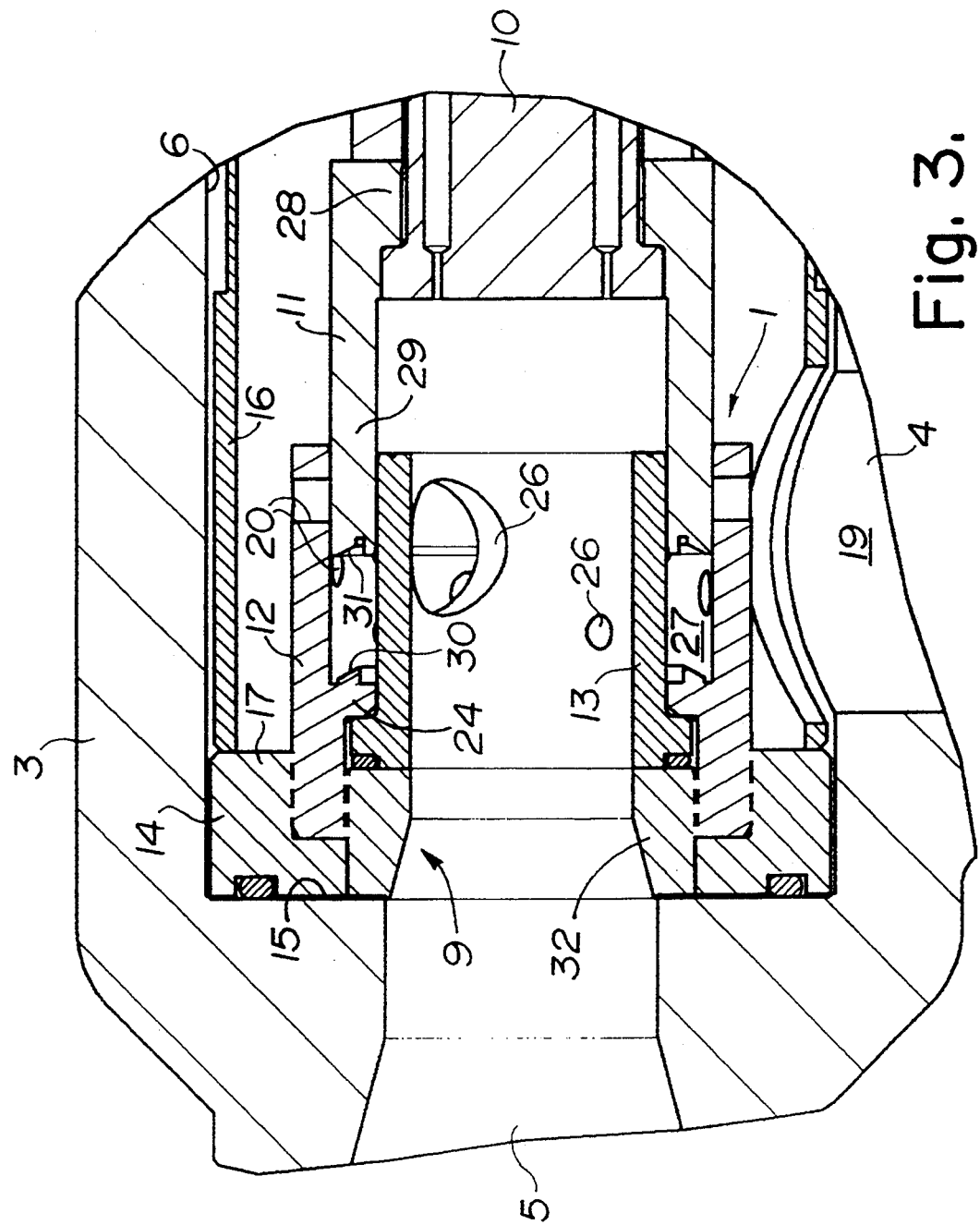
FIG. 3 is a sectional side view of the flow trim in a throttling position.
Figure 4:
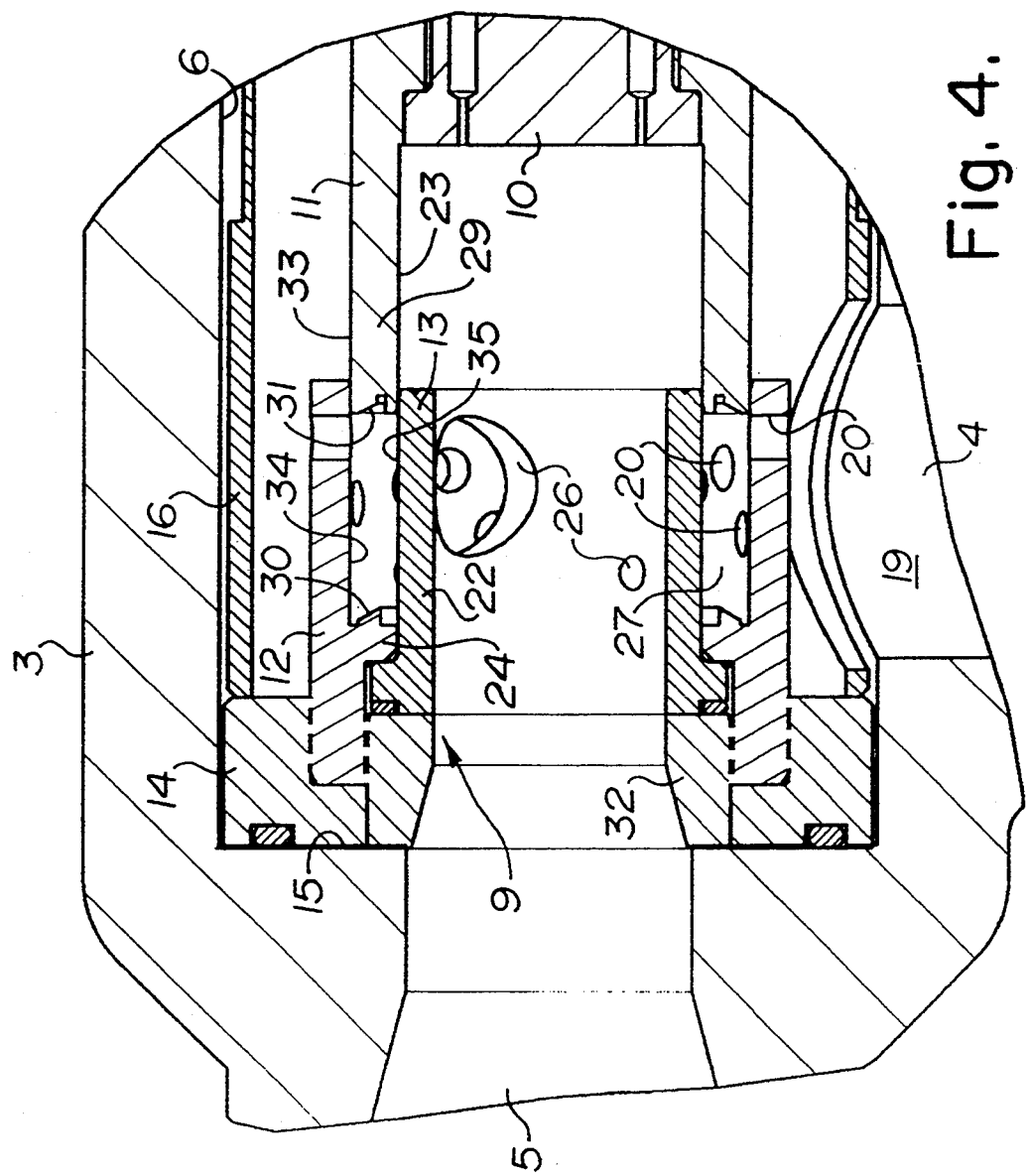
FIG. 4 is a sectional side view of the flow trim in the fully open position.
Figure 5:
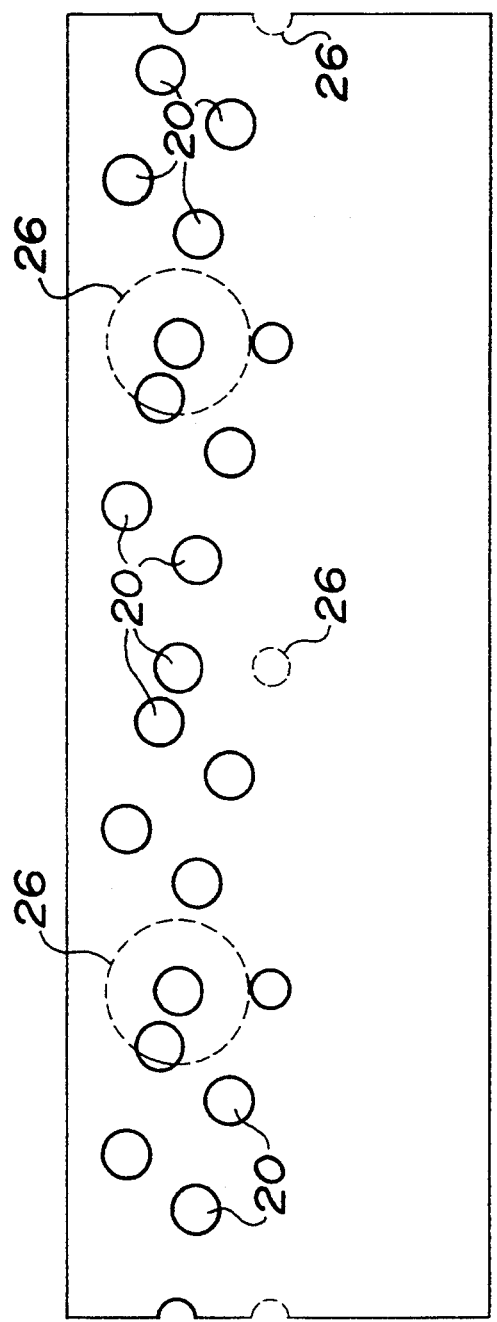
FIG. 5 is a flattened layout showing the superimposed arrangement of the ports of the inner and outer cages.

The invention is centred on the flow trim 1. Thus the details of the remainder of the choke 2, in which the flow trim is incorporated, will only be described generally.

More particularly, the choke 2 is generally T-shaped, having a hollow body 3 with a side inlet 4 and end outlet 5. The body 3 defines an axial bore 6 that communicates with the inlet 4 and outlet 5. The inlet 4 and outlet 5 are flanged, for connection into a flow line (not shown). Thus fluid may enter the bore 6 through the inlet 4, change direction and exit through the outlet 5.

A bonnet 7 closes the end of the bore 6, remote from the outlet. The bonnet 7 is retained in place by capscrews 8 threaded into the body 3.

A threaded stem 10 extends through the bonnet nut 8 and bonnet 7 into the bore 6. At its inner end, the stem 10 is connected to the throttling collar 11 of the flow trim 1. Rotation of the stem 10 will advance or retract the throttling collar 11 along the axis of the bore 6. The assembly is suitably sealed, as indicated in the Figures.

Turning now to the flow trim 1, it comprises an outer/inner cage means or assembly 9, and the throttling collar 11.

The outer/inner cage assembly 9 comprises an outer cage 12, an inner cage 13, a flanged base 14, and a base 32, all generally cylindrical in configuration, which when assembled together form essentially one solid unit. This is achieved by firstly press fitting the outer cage 12 into the flanged base 14, secondly by inserting the inner cage 13 into the outer cage 12 and up against the inner cage 13, thereby securing it in place against internal shoulder 24 of the outer cage 12.

A sleeve 16 extends between the flange 17 of the base 14 and the bonnet 7, to lock the outer/inner cage assembly 9 firmly against the body shoulder 15.

A tubular, cylindrical wall 18 of the outer cage 12 projects from the base 14, coaxially with the axis of the bore 6, and extends transversely of the bore 19 of the inlet 4. The cylindrical wall 18 forms a plurality of ports 20 extending perpendicularly therethrough. The inner bore 34 of the outer cage 12 fits snugly against the outer surface 33 of the throttling collar 11.

A tubular, cylindrical wall 22 of the inner cage 13 projects from the base 32 in the same manner as the cylindrical wall 18 aforementioned. The cylindrical wall 22 forms a plurality of ports 26 extending perpendicularly therethrough. The outer surface 35 of the inner cage 13 fits snugly against the inner bore 23 of the throttling collar 11.

The ports 26 of the inner cage 13 are four in number, being arranged in two diametrically opposed pairs, each pair being offset 180° from the other. The first opening pair is relatively small in diameter and the second opening pair is relatively larger.

The cylindrical walls 18, 22 are spaced apart radially to form an annulus 27 that is closed at the valve outlet end and is open at the other end.

The throttling collar 11 has a base 28 attached to the stem 10. A solid, tubular, cylindrical wall 29 projects from the base 28. The cylindrical wall 29 is adapted to fit snugly between the cylindrical walls 22, 18 of the inner and outer cages and to be biased longitudinally within the annulus 27, to open and close the ports 26, 20.

The outer cage 12 forms an annular shut-off seat 30 at the foot of the annulus 27. The leading edge of the throttling collar 11 forms an annular seal surface adapted to contact seat 30 to effect a shut-off when the throttling collar 11 is fully extended into the annulus 27 by the stem 10.

Port Design

The external cage ports are selected in size and location to provide the following:

(1) the combined outer cage port area is equivalent or substantially equal to the port area of the inner cage ($\pm 20\%$ typically);

(2) throughout the movement range of the throttling collar, the total exposed port areas of the external cage and internal cage are equivalent; and (3) the external cage ports are circumferentially positioned to minimize alignment with the inner cage ports.

The exterior port size is dictated by the clearance between the inner and outer cage with the criteria that the throttling (pressure drop) occur across the port and not in the clearance area. This design is based on the exterior cage providing the first drop, the intermediate area providing pressure stabilization, and the final drop being taken across the interior port. The diameter of the exterior ports is thus limited to being equal or smaller than the inner to outer cage clearance gap. Based on this diameter the number and placement of ports is selected to meet the requirements of points 1 and 2 and 3.

The inner cage ports are diametrically opposed to cause fluid jets from each port to impinge upon each other within the cage bore to absorb the fluid's energy. The downstream ports are smaller than the upstream ports to provide an equal percent (%) flow characteristic.

An advantage of this cage design is it's high pressure recovery coefficient ($F_L$) relative to a multiported cage. This high $F_L$ valve increases the allowable pressure drop before cavitation conditions would occur and increases the overall effectiveness of the two stage trim.

The embodiments of the invention in which an exclusive property or privilege is claimed are defined as follows:

1. In a choke for controlling high pressure flow in a line, comprising a valve body forming an axial bore and having a side inlet and end outlet communicating with the bore, a flow trim, mounted in the bore, for controlling flow between the inlet and outlet, said flow trim comprising stationary, port-forming cage means and movable throttling means adapted to be biased longitudinally along the cage means to open or close its ports, said cage means comprising a generally tubular outer cage, having a cylindrical wall extending transversely of the inlet and forming a plurality of flow ports extending therethrough and aligned with the inlet, and a generally tubular inner cage mounted within the outer cage and being generally coaxial and coextensive therewith, said inner cage having a cylindrical wall extending transversely of the inlet and forming a plurality of flow ports extending therethrough and aligned with the inlet, said inner cage cylindrical wall being spaced inwardly from the outer cage cylindrical wall so that they define an annulus between them, said cage means forming an annular shut-off seat at the end of the annulus adjacent the end outlet, said throttling means comprising a tubular cylindrical collar adapted to slide along the annulus between the cylindrical walls of the cage means to throttle the ports of the cages, said collar having an annular seal surface at its leading edge for sealing against the shut-off seat to effect a shut-off of flow through the choke, the improvement comprising:

the inner cage having first and second opening pairs of diametrically opposed ports spaced along the length of its cylindrical wall, the second opening ports having a larger diameter than either the first opening ports or the ports of the outer cage; the ports of the two cages being sized and distributed so that the opened flow areas of the inner and outer cage ports remain substantially equal at every collar throttling position;

the outer cage having a greater number of ports than the inner cage.

2. The choke improvement as set forth in claim 1, wherein the combined area of the outer cage ports is substantially equal to the combined area of the inner cage ports.

3. The improvement as set forth in claim 2, wherein the ports of the outer cage are offset circumferentially from the ports of the inner cage.

4. The improvement as set forth in claim 3, wherein the diameters of the ports of the outer cage are less than the width of the annulus.

5. The improvement as set forth in claim 2, wherein the diameters of the ports of the outer cage are less than the width of the annulus.

6. The improvement as set forth in claim 1, wherein the ports of the outer cage are offset circumferentially from the ports of the inner cage.

7. The improvement as set forth in claim 6, wherein the diameters of the ports of the outer cage are less than the width of the annulus.

8. The improvement as set forth in claim 1, wherein the diameters of the ports of the outer cage are less than the width of the annulus.

* * * * *